Patented Apr. 6, 1937

2,076,295

UNITED STATES PATENT OFFICE 2,076,295

INSULATING MATERIALS

Alfred Curs and Hans Wolf, Ludwigshafen-on-the-Rhine, Germany, assignors, by mesne assignments, to Plaskon Company Inc., Toledo, Ohio, a corporation of Delaware No Drawing. Application December 8, 1934, Serial No. 756,701. In Germany December 28, 1933

8 Claims. (Cl. 106—22)

The present invention relates to insulating materials having a high thermal and acoustic insulation power and a process of producing same.

It has already been proposed to prepare a porous, non-elastic heat-insulating composition by drying a foam-like glue solution, prepared with the aid of foam-forming agents or of a foam formed from the same, and then hardening the resulting product by means of chemical hardening agents. The products thus obtained have not proved satisfactory in practice. They have, in addition to small air bubbles of good insulating power, numerous large air bubbles which considerably impair the insulating action. There is further the special disadvantage that the said compositions prepared from glue swell strongly in moist air, whereby they absorb fully like a sponge; moreover they are converted by water into an unsuitable slimy mass after a short time. In both cases the insulating power is wholly lost.

We have now found that excellent heat-insulating compositions can be obtained by converting solutions of condensation products capable of being hardened derived from a urea, such as urea itself, thiourea or their derivatives and aldehydes, in particular formaldehyde, into foam-like masses by a mechanical treatment, as for example by vigorous stirring or beating, while adding a foam-forming substance and by then hardening the said foam-like mass. The foam-forming substance may be added to the solution of the condensation product as such or in the form of a ready-made foam.

As foam-forming substances may be mentioned especially those of acid nature, as for example alkylated naphthalene sulphonic acids, because both the formation of foam and the hardening of the condensation products are favored by the presence of free hydrogen ions. When employing weakly acid or neutral foam-forming agents or foam-like substances, such as the reaction products of alkylene oxides with aliphatic alcohols of high molecular weight, for example the poly-ethylene glycol ethers of the octodecylalcohol or octodecenylalcohol, or the sodium salt of the N-methyl oleyl taurin, it is therefore preferable to add small amounts of acids, as for example sulphuric acid. Substances, such as chloral hydrate, which split off acids at elevated temperatures may also be incorporated with the foam. Furthermore, the hardening of the foam may be effected by treatment with gaseous acids, as for example in an atmosphere of sulphur dioxide.

The hardened masses prepared in the said manner consist of very many extremely small cells, entirely closed in themselves, of practically the same size; they absorb no water in an atmosphere saturated with water vapor and retain their strength even when in contact with water itself. They therefore constitute excellent insulating compositions having high thermal and acoustic insulating power.

The following example will further illustrate the nature of this invention but the invention is not restricted to this example.

Example 4 cubic centimeters of butylated naphthalene sulphonic acid and 40 cubic centimeters of water are caused to foam by vigorous stirring or beating for a short time, say half a minute. 800 cubic centimeters of a cold, neutralized, aqueous solution containing about 32% of a urea-formaldehyde condensation product (prepared in the presence of a small amount of an acid or an acid salt, as for example formic acid or primary sodium phosphate, or of a mixture of the said acid and the said salt, at a pH value of from about 3 to 5 and at a temperature of from about 90° to about 100° C. from urea and formaldehyde in the molecular ratio of 1:2) are then poured into the foam while stirring or beating vigorously. After stirring for from 3 to 6 minutes, a foam is obtained which no longer runs off from a vertical wood surface.

The stirred foam may be hardened in the stirring vessel or spread into any desired mould and removed even after from 1 to 2 hours. When using a mould it is preferable to use perforated mould walls, as for example of wire gauze or perforated sheet metal, so that air may be accessible to the moulded article on all sides. The hardening, i. e. the further condensation of the urea-formaldehyde condensation product, takes place with the gradual evaporation of water at room temperature, but more rapidly at elevated temperatures. The hardening or drying out should not proceed too rapidly, however, in order that the foam structure is not impaired. It is preferable, therefore, especially when employing elevated temperatures, as for example a temperature of about 60° C. to carry out the drying in moist air or to effect the hardening by placing the formed body into hot water having a temperature from about 60° to about 80° C.

The specific gravity and the strength of the insulating compositions may be varied within wide limits according to desire. For example by employing an about 45 per cent solution of condensation product instead of one of about 32 per cent, a product having a greater weight per unit of volume and greater strength is obtained. The same result is obtained by adding a more concentrated solution of the condensation product, as for example a 65 per cent solution, to the foam prepared from the 32 per cent solution shortly before the final stirring. Furthermore 0.1 and 0.1, according to desire.

sequently the weight per unit of volume of the finished product may be influenced by varying the speed of stirring, the duration of stirring and the amount of foaming agent. It is thus possible to prepare insulating masses having a specific gravity less than 0.5, even as low as between 0.1 and 0.01, according to desire.

If it is desired to obtain uniformly colored insulating compositions, corresponding pigments, as for example iron oxide red, iron oxide yellow, iron oxide black, chromium oxide green, chrom yellow, umber or carbon black or soluble dyestuffs, as for example crystal violet (see Schultz, Farbstofftabellen, 7th ed., Vol. I, page 325, No. 785) or Sirius Read BB (Schultz, l. c., Vol. II, page 198), may be stirred into the foam. If desired only the surface of the compositions may be colored as for example by painting them with solutions containing oil colors or bitumen. In this manner a strengthening of the surface is obtained at the same time; this is especially advantageous in the case of products having a small weight per unit of volume. Such strengthening of the surface may also be effected by painting with waterglass, fatty oils, varnishes or solutions of natural or synthetic resins, as for example with a shellac solution or a foam-free solution of a urea-formaldehyde resin. Furthermore metal foils, veneers, wall-papers, or cellulose or textile fabrics may be stuck onto the surface.

When large pieces of the insulating compositions according to this invention are to be joined to each other or to a substratum to be insulated without gaps or joints, they may be stuck by means of adhesives, as for example solutions of urea-formaldehyde condensation products or by brushing freshly stirred foam between them. The insulating compositions may also be stuck or nailed to suitable substrata.

What we claim is:

1. The process of producing cellular insulating materials which comprises converting solutions of condensation products of a urea and an aldehyde into a foam-like mass by a mechanical treatment while adding a foam of an acid nature, and then hardening the foam-like mass thus produced, while in an acid state and controlling the hardening in order to maintain the foam structure.

2. The process of producing cellular insulating materials which comprises converting solutions of condensation products of a urea and an aldehyde into a foam-like mass by a mechanical treatment while adding a foam-forming substance of an acid nature, and then hardening the foam-like mass thus produced while utilizing said substance as a hardening agent and controlling the hardening in order to maintain the foam structure.

3. The process of producing cellular insulating materials which comprises converting solutions of condensation products of a urea and an aldehyde into a foam-like mass by a mechanical treatment while adding a foam-forming substance of an acid nature, and then hardening the foam-like mass thus produced at elevated temperature while utilizing said substance as a hardening agent and controlling the hardening in order to maintain the foam structure.

4. The process of producing cellular insulating materials which comprises converting solutions of condensation products of a urea and an aldehyde into a foam-like mass by a mechanical treatment while adding a foam-forming substance of an acid nature, and then hardening the foam-like mass thus produced at elevated temperature while utilizing said substance as a hardening agent, moisture being present and controlling the hardening in order to maintain the foam structure.

5. Cellular insulating material consisting essentially of a hardened foam-like condensation product of a urea and an aldehyde, and having a specific gravity of between 0.1 and 0.01 said material being substantially the same as is obtainable by converting solutions of condensation products of a urea and an aldehyde into a foam-like mass by a mechanical treatment in the presence of a foam forming substance of an acid nature, hardening the foam-like mass thus produced while in an acid state and controlling the hardening to maintain the foam structure.

6. Insulating material consisting essentially of a hardened foam-like condensation product of a urea and an aldehyde having small cells entirely closed in themselves, the specific gravity of the said material being between 0.1 and 0.01 said material being substantially the same as is obtainable by converting solutions consisting essentially of condensation products of a urea and an aldehyde into a foam-like mass by a mechanical treatment in the presence of a foam forming substance of an acid nature, hardening the foam-like mass thus produced while in an acid state and controlling the hardening to maintain the foam structure.

7. The process as defined in claim 3 wherein the foam-forming substance of an acid nature is an alkylated aromatic sulfonic acid.

8. The process as defined in claim 3 wherein the foam-forming substance of an acid nature is butylated naphthalene sulfonic acid.

ALFRED CURS.
HANS WOLF.

CERTIFICATE OF CORRECTION.

Patent No. 2,076,295. April 6, 1937.

ALFRED CURS, ET AL.

It is hereby certified that error appears in the printed specification of the above numbered patent requiring correction as follows: Page 2, first column, line 8, strike out the words and period "0.1 and 0.1, according to desire." and insert instead the words and syllable the number and size of the single cells and con-; and that the said Letters Patent should be read with this correction therein that the same may conform to the record of the case in the Patent Office.

Signed and sealed this 21st day of September, A. D. 1937.

(Seal) Acting Commissioner of Patents.